US007739782B2

(12) United States Patent
Denham et al.

(10) Patent No.: US 7,739,782 B2

(45) Date of Patent: Jun. 22, 2010

(54) METHOD OF INSTALLING BLIND FASTENER

(75) Inventors: Keith Denham, Hertfordshire (GB); Jonathan Lee Brewer, Bedfordshire (GB)

(73) Assignee: Avdel UK Limited (GB)

(*) Notice: Subject to any disclaimer, the term of this patent is extended or adjusted under 35 U.S.C. 154(b) by 178 days.

(21) Appl. No.: 11/972,331

(22) Filed: Jan. 10, 2008

(65) Prior Publication Data

US 2008/0107499 A1 May 8, 2008

Related U.S. Application Data

(62) Division of application No. 10/545,906, filed as application No. PCT/GB2004/001795 on Apr. 27, 2004, now Pat. No. 7,645,104.

(30) Foreign Application Priority Data

May 16, 2003 (GB) ................................ 0311270.3

(51) Int. Cl.
*B23P 19/02* (2006.01)
*F16B 4/00* (2006.01)

(52) U.S. Cl. ........................................ 29/525; 411/548

(58) Field of Classification Search ................... 29/447, 29/525, 525.01, 525.04, 525.05, 525.14, 29/821; 411/548, 34, 29–31, 37; 83/16, 83/171, 164

See application file for complete search history.

(56) References Cited

U.S. PATENT DOCUMENTS

| | | | | |
|---|---|---|---|---|
| 4,499,647 A | | 2/1985 | Sakamura et al. | |
| 5,060,363 A | * | 10/1991 | Headrick | 29/557 |
| 5,267,386 A | | 12/1993 | Brooks | |
| 6,227,433 B1 | | 5/2001 | Waldron et al. | |

FOREIGN PATENT DOCUMENTS

| | | |
|---|---|---|
| DE | 31 09 500 | 10/1982 |
| DE | 102 41 326 | 3/2004 |
| EP | 0 585 019 | 3/1994 |
| EP | 0 945 631 | 9/1999 |
| JP | 58-59033 | 4/1983 |

* cited by examiner

*Primary Examiner*—John C Hong

(74) *Attorney, Agent, or Firm*—Trexler, Bushnell, Giangiorgi, Blackstone & Marr, Ltd.

(57) ABSTRACT

A blind fastener (11) for installation in a thermoplastic workpiece, which blind fastener has a leading end face (21) which is substantially flat and non-abrasive and without drilling teeth, so that when the leading end face of the fastener is held in contact with the near face of the thermoplastic workpiece (22) and heat and pressure are applied to the contacted area of the workpiece by means of the leading end of the fastener, the fastener progressively forms a hole through the thermoplastic workpiece in which hole it can then be installed.

10 Claims, 6 Drawing Sheets

Fig. 1B
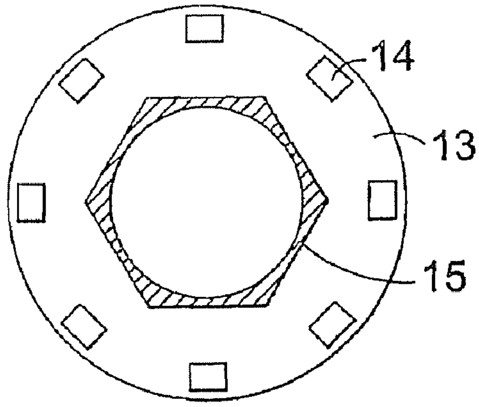
Fig. 1A
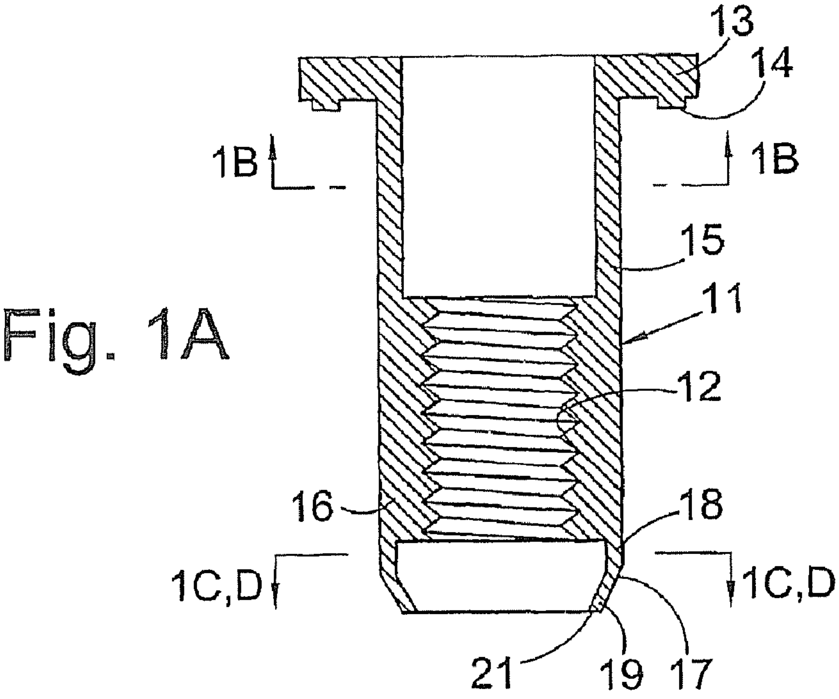
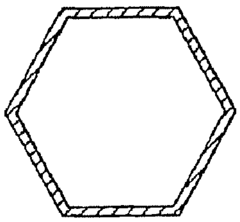
Fig. 1C
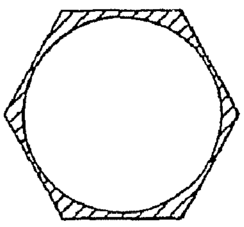
Fig. 1D

METHOD OF INSTALLING BLIND FASTENER

RELATED APPLICATION (PRIORITY CLAIM)

This patent application is a divisional of U.S. patent application Ser. No. 10/545,906, filed on Jun. 22, 2006, which was a National Phase filing regarding International Application No. PCT/GB2004/001795, which relies upon British Application No. 0311270.3 for priority.

BACKGROUND OF THE INVENTION

The present invention relates in one of its aspects to a blind fastener, and in another of its aspects to a method of installation of such a blind fastener into a suitable workpiece.

The term “fastener” is used to include, for example, a rivet which secures together two or more members forming a workpiece, and also, for example, a threaded insert which, when installed in a workpiece, allows a screw to be engaged therewith to secure another member to the workpiece. Such a threaded insert may be such that it will also secure together two or more members forming a workpiece.

By “blind” is meant a fastener which can be installed in the workpiece by access to only the front or near side of the workpiece.

It is clearly advantageous if the number of separate operations involved in such installation can be reduced. Most such fasteners require the provision of a suitable pre-formed hole through the workpiece through which the fastener is inserted. Fasteners which drill their own hole do exist, the fastener having teeth on its leading end to provide drilling means which with suitable rotation of, and axial pressure on, the fastener drills a suitable hole. However, such an arrangement has numerous practical disadvantages. These may be summarized as follows:

1. additional cost of manufacture and inspection of drill teeth on each fastener, and of non-damaging handling thereof after manufacture;

2. skidding or skating of the core drill across the workpiece face when attempting initial location;

3. mechanical damage to the workpiece, especially if the latter is laminated i.e. consists of more than one member;

4. the insert must be circular in exterior section along all of that part of its length which enters the hole;

5. the drilling operation produces debris from the workpiece, and a drilled-out slug, which may be inconvenient and possibly dangerous;

6. the drill teeth on the installed fastener can provide a hazard on the blind side of the workpiece.

The present invention aims to provide a fastener, and a method of installation of such a fastener, which overcomes these disadvantages.

BRIEF SUMMARY OF THE INVENTION

Accordingly, the present invention provides, in one of its aspects, a blind fastener as set out below.

The present invention also provides a method of forming a hole in a thermoplastic workpiece as set out below.

Further features of the invention are set out below.

BRIEF DESCRIPTION OF THE DRAWINGS

Specific embodiments of the invention will now be described by way of example and with reference to the accompanying drawings, in which:

FIGS. 1A to 1D show a blind fastener in the form of a threaded insert;

DETAILED DESCRIPTION OF EMBODIMENTS OF THE INVENTION

Figures 2A, 2B, 2C, 2D, 2E, 2F:
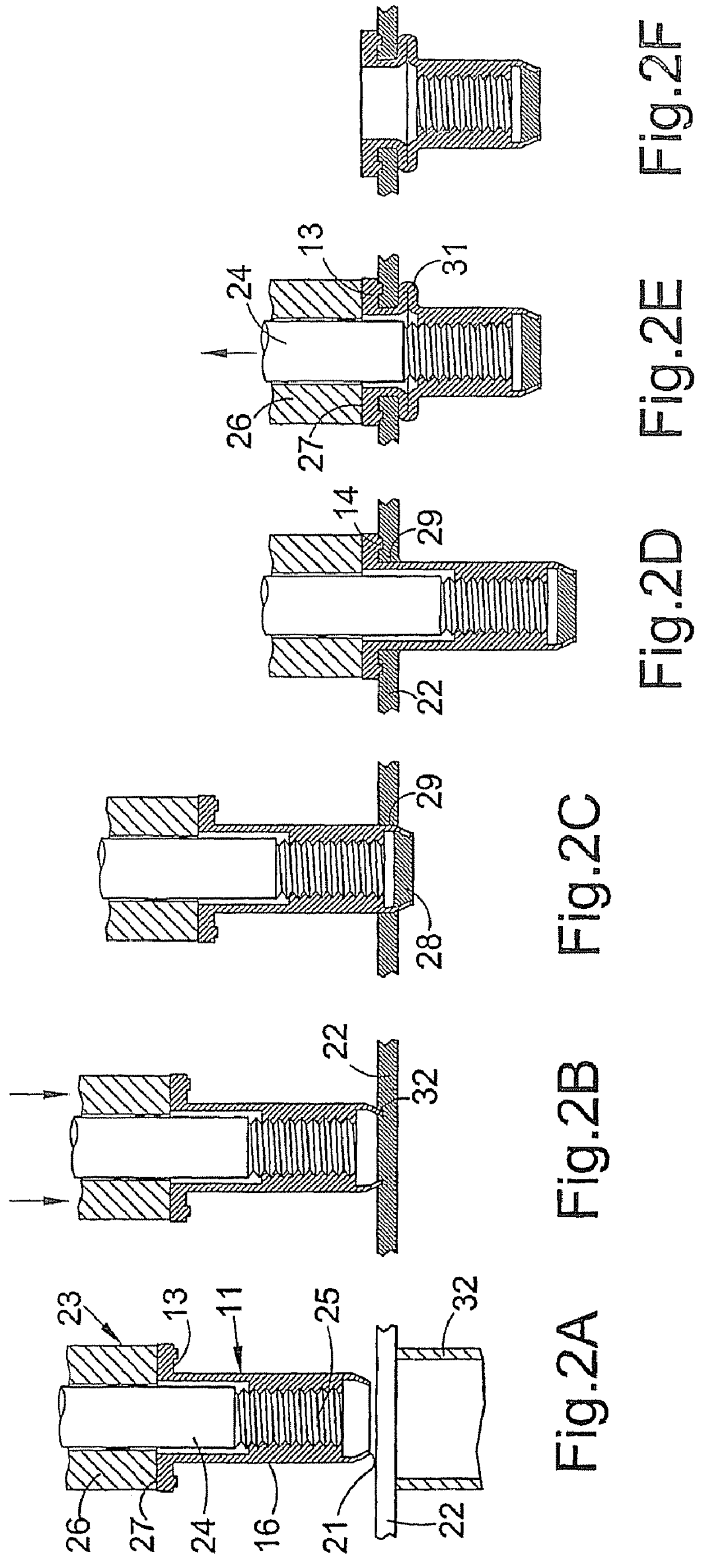
FIGS. 2A to 2F show successive stages in the formation of a hole through a thermoplastic workpiece and the installation of the insert therein.

Referring to FIGS. 1A-1D, FIG. 1A is a longitudinal axial section through a threaded insert 11. FIG. 1B is a cross-section on the line 1B-1B, and FIG. 1C is a section on the line 1C-1C. The insert is made of low-carbon steel, and this example is 21.5 mm in overall length, has a hexagonal body with an across-flats dimension of 9 mm and has an M6 internal thread 12. At one end the insert has a radially enlarged head 13 with lugs 14 projecting from its underside.

The body comprises a relatively thin-walled collapsible portion 15 adjacent the head, followed by an internally threaded portion 16 containing the M6 thread 12. Projecting beyond the remote end of the threaded portion 16 is a rim 17, comprising first a parallel part 18 and then an inwardly tapered part 19, bearing a flat end face 21. The wall thickness of the rim is as small as practicable, having regard to the needs of manufacturing and handling of the inserts. The tapering part 19 of the rim is at an angle of 30.degree. to the insert axis, which has been found to be the optimum angle for this example insert. The total axial length of the rim 17 should be approximately equal to, or greater than, the thickness of the thermoplastic workpiece in which it is to be used.

A possible alternative cross-sectional shape for the rim 17 is shown in FIG. 1D.

Turning to FIGS. 2A-2F, to form the hole in a thermoplastic workpiece 22 the insert 11 is mounted on a tool 23 comprising an elongated mandrel 24 with an end portion 25 which is externally threaded and engages the thread 12 of the internally threaded portion 16 of the insert.

The tool also comprises a cylindrical body 26, through which the mandrel 24 extends and projects, having a flat end face 27 providing an anvil which engages the end face of the insert head 13.

The fastener is offered up to the workplace 22 in the appropriate place so that the end face 21 of the rim contacts the near face (the upper face as shown in FIGS. 2A-2F). Heat is applied to the contacted area of the workpiece by means of the rim face 21 (by means which will be described later). Pressure is also applied to the contacted area, by pushing the tool 23 towards the workpiece.

As illustrated in FIG. 2B, the consequent local softening of the workpiece 22 allows the front part 19 of the rim to enter the workpiece. The rim progressively penetrates the workpiece thickness, and FIG. 2C shows the rim having broken through the lower surface of the workpiece. The rim 17 has cut out a slug 28 of the workpiece material, which slug is retained in the rim by virtue of the slug flowing and then solidifying to fill the larger diameter part of the aperture within the rim provided by its increasing internal diameter further away from the end face 21.

FIG. 2D shows the insert fully pushed into hole 29 which has been formed by the insert the lugs 14 under the insert body head 13 have locally softened and entered into the upper face of the workpiece 22, so as to provide additional resistance to the insert body rotating with respect to the workpiece.

To install the insert, the tool is then operated to axially withdraw the mandrel 24, whilst supporting the head 13 against the end anvil face 27 of the tool body 26. This causes the collapsible portion 15 of the insert body to fold outwardly to form a flange 31, as shown in FIG. 2E, which clamps the insert to the workpiece by reaction against the insert head 13. The tool mandrel 24 is then rotated to unscrew from the insert, and the tool is removed, leaving the insert installed in the workpiece as illustrated in FIG. 2F.

If needed, the workpiece 22 can be supported against flexing under the hole-forming pressure by means of an oversize hollow support 32, illustrated only in FIG. 2A.

It will be appreciated that the fastener has formed an appropriate hole in the workpiece, and has been installed therein, in one continuous operation. The slug from the hole is prevented from falling off the installed fastener by being retained by the rim 17. It has been found that, in this example fastener, the slug is retained against a force of 400 Newtons, which is sufficient to prevent it vibrating loose in normal use of the finished product. However the slug will eject and not jam if an overlong screw is inserted in the threaded insert with normal tightening torque.

Figure 3D:
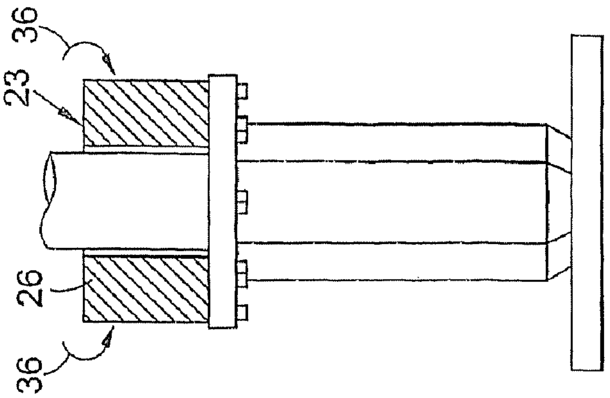
FIGS. 3A to 3D show alternative means of generating heat.
Figure 3C:
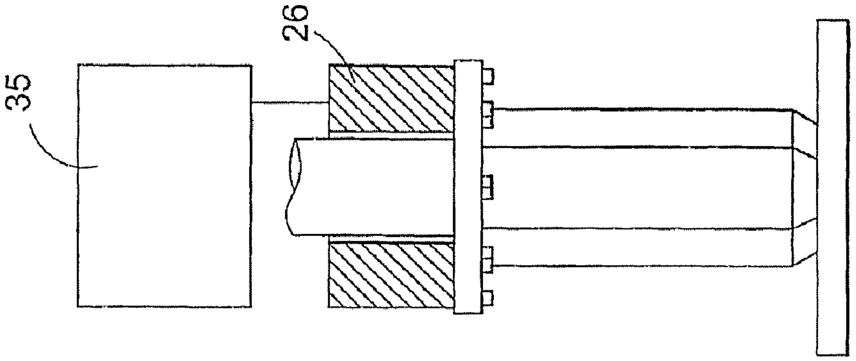
Figure 3B:
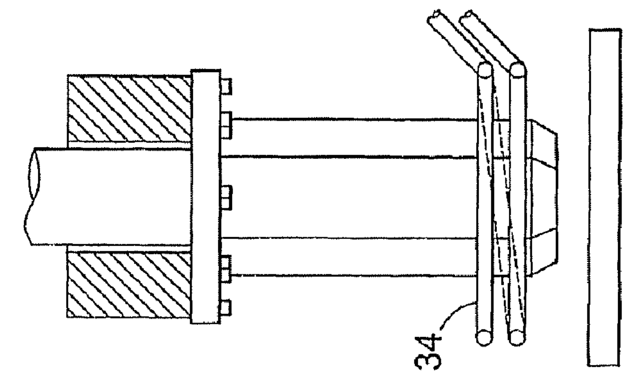
Figure 3A:
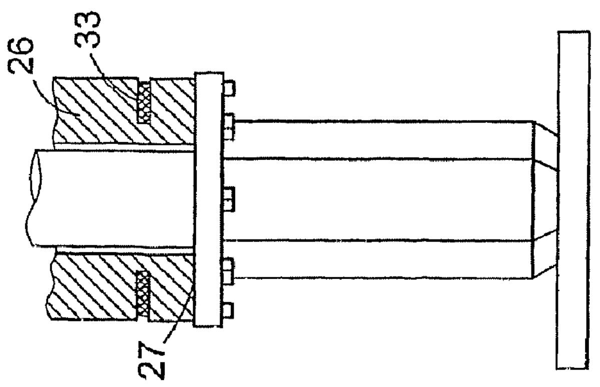
Figure 4C:
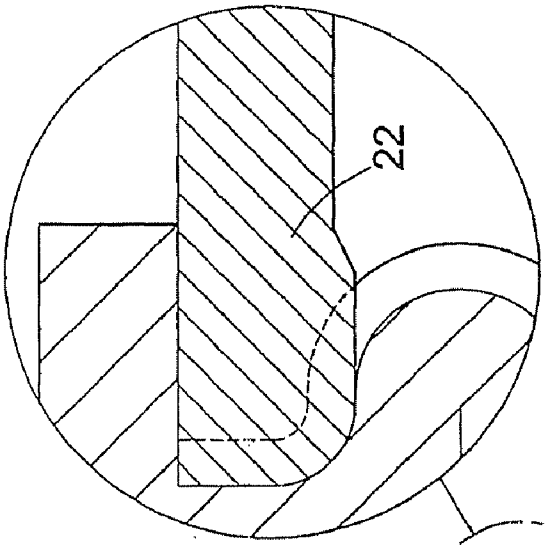
FIGS. 4A to 4C show an alternative form of threaded insert.
Figure 4B:
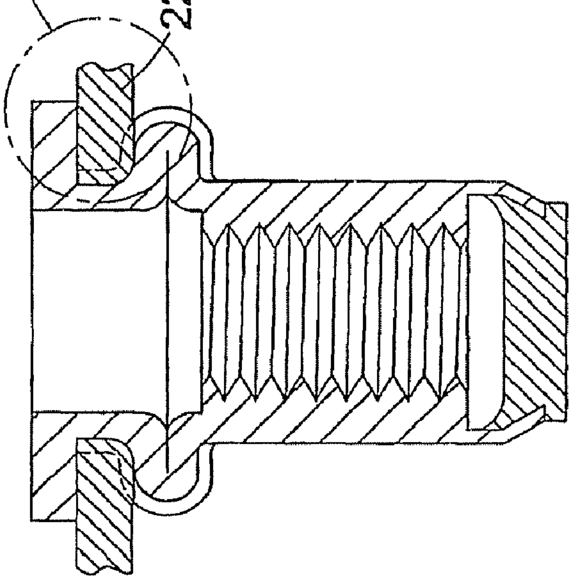
Figure 4A:
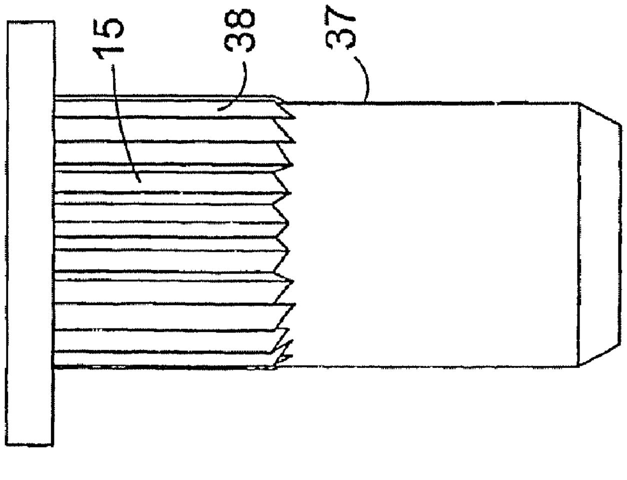

FIGS. 3A to 3D illustrate various methods of generating heat at the contact area of the workpiece. FIG. 3A shows an electrical heater 33 embedded in the tool body 26 near its end face. The heat is transmitted via the tool body, along the insert body to the contacting end face of the body rim. FIG. 3B shows an induction heating coil 34 surrounding the lower end of the insert, for heating the insert. FIG. 3C shows schematically an ultrasonic generator 35 for applying ultrasonic vibration to the tool body 26 and thus by transmission along the insert to the contact area of the workpiece. FIG. 3D illustrates the low-amplitude rotational oscillation of the insert with respect to the workpiece by means of suitable movement of the tool 23, as indicated by the contra-arrows 36. The friction between the insert and the workpiece generates the heat FIGS. 4A-4C illustrate a possible alternative external form for the example insert described above. The exterior of the body portion 37 is cylindrical in section, and the exterior of the collapsible portion 15 is formed with splines 38, which engage the workpiece around the hole to prevent relative rotation. When the collapsible part folds outwardly upon installation, the splines also engage the underneath face of the workpiece 22, as illustrated in FIGS. 4B and 4C.

FIGS. 5A to 5E illustrate an alternative form of fastener in the form of a blind rivet. This rivet (FIG. 5A) is generally similar to the well-known HEMLOK(Register Trade Mark) rivet. It comprises an elongated tubular shell 41, having an enlarged head 42 at one end. It also comprises an elongated mandrel 43 having an enlarged head 39 adjacent the tail end of the shell. The mandrel has a breakneck 44, in the appropriate place. The mandrel head 39 has a projecting rim 17, similar to that in the insert previously described.

FIGS. 5B to 5E show the use of this rivet to secure a non-thermoplastic workpiece 45 to a thermoplastic workplace 46. The workplace 45 is provided with a preformed hole 47 to accommodate the rivet body. The forming of the hole in the thermoplastic workpiece 46, and the installation of the rivet to secure the workpieces together, are analogous to the process described above with reference to the insert.

Figure 5A:
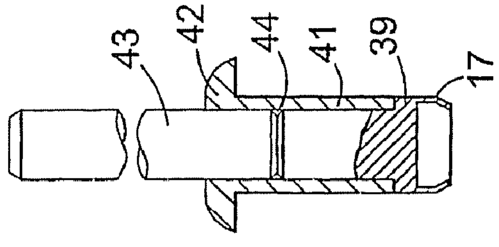
FIGS. 5A to 5E show a blind fastener in the form of a blind rivet and the successive stages in its formation of a hole in a thermoplastic workpiece and its installation therein.
Figure 5B:
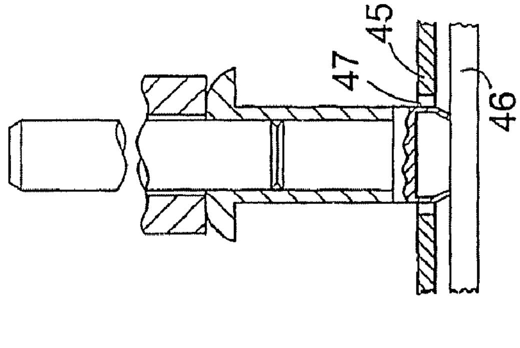
Figure 5C:
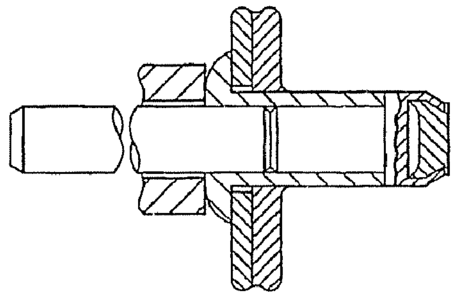
Figure 5D:
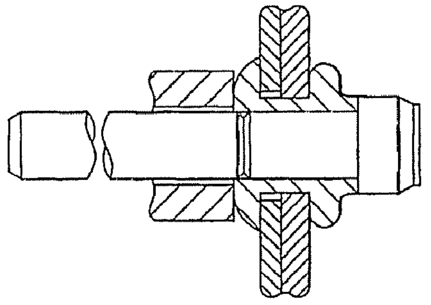
Figure 5E:
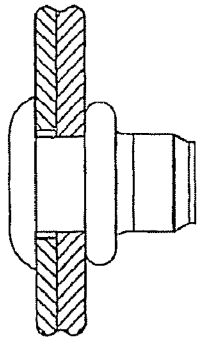
Figure 6:
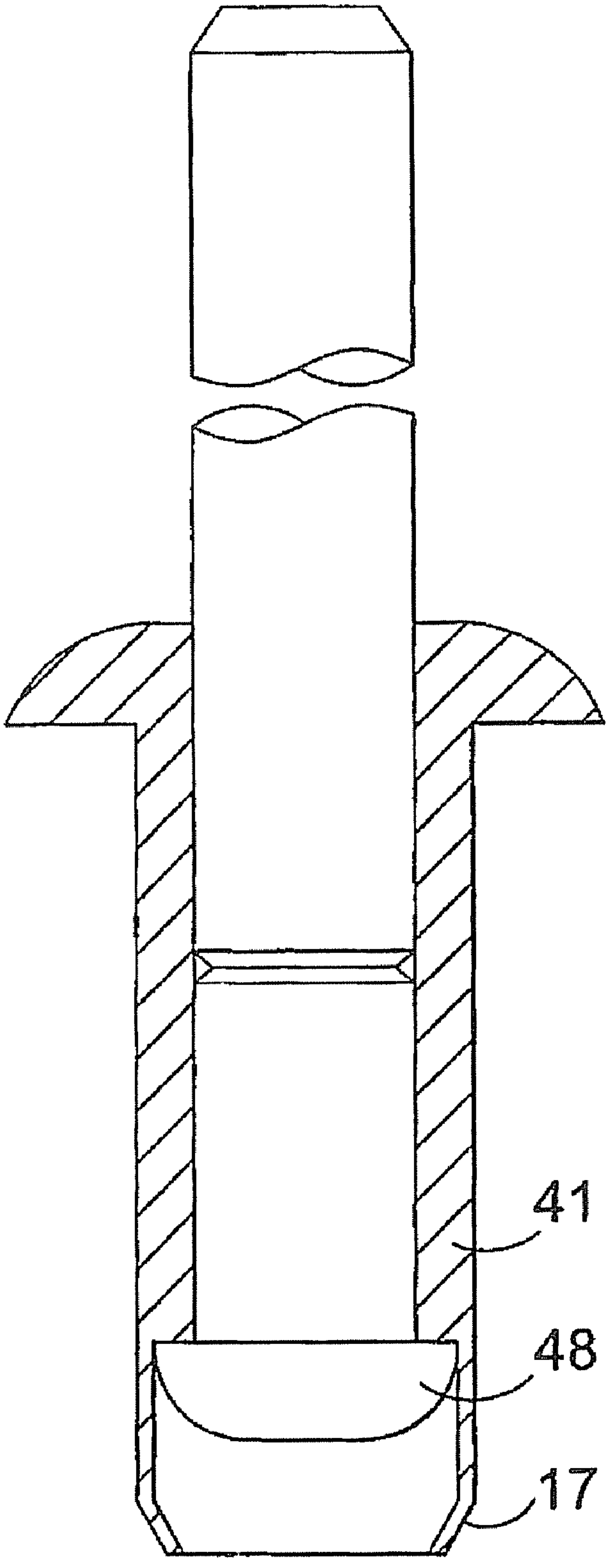
FIG. 6 shows an alternative form of blind rivet.

FIG. 6 corresponds to FIG. 5A, and shows an alternative arrangement in which the rim 17 is provided as part of the rivet shell, the mandrel head 48 being accommodated inside the rim.

In order to ensure that the underhead lugs, or the splines, which are adjacent the head of the fastener, can enter into the thermoplastic workpiece as described in the foregoing examples, the application of heat may be continued for a sufficient time after the fastener has penetrated the workpiece and formed the hole.

Where the exterior of the fastener body is circular in cross-section, an alternative method of generating frictional heat at the contact area is by the continuous rotation of the fastener with respect to the thermoplastic workpiece.

The invention is not restricted to the details of the examples described above. For instance, the underhead lugs 14 may be omitted, in cases where the hexagonal or splined shape of the body provides sufficient resistance to rotation of the fastener in the workpiece. The fastener head underside may be provided with a continuous annular projection which, on installation by the methods described above, enters the near face of the thermoplastic workpiece to provide a barrier to the ingress of fluid.

The invention claimed is:

1. A method of forming a hole in a thermoplastic workpiece without drilling thereof in order to install a blind fastener therein, wherein the blind fastener has a leading end face which is substantially flat and non-abrasive and without drilling teeth, and wherein the leading end face of the blind fastener is adapted to be held in contact with a near face of the thermoplastic workpiece, and wherein the leading end face of the fastener is provided by the end face of a forwardly projecting rim surrounding an aperture, which method comprises: contacting the near face of the workpiece with the leading end face of the blind fastener, and applying heat and pressure to the contacted area of the workpiece by means of the leading end face of the blind fastener, whereby the forwardly projecting rim of the blind fastener has a wall thickness that is sufficiently small such that the blind fastener progressively forms a hole through the thermoplastic workpiece in which hole it can subsequently be installed, wherein the aperture is adapted to receive a slug of the workpiece material formed by the leading end face, and wherein the blind fastener includes means for preventing the slug from dropping off the leading end of the fastener after the latter has penetrated the workpiece.

2. A method as claimed in claim 1, in which the heat is generated externally of the fastener.

3. A method claimed in claim 2, in which the heat is generated by a heat generator associated with an installation tool which the fastener is engaged.

4. A method as claimed in claim 1, in which the heat is generated by induction heating of the fastener.

5. A method as claimed in claim 1, in which the heat is generated by friction between the leading end face of the fastener and the contacted area of the workpiece.

6. A method as claimed in claim 5, in which the fiction is produced by low- amplitude rotational oscillation of the fastener with respect to the workpiece.

7. A method as claimed in claim 5, in which the friction is produced by continuous rotation of the fastener with respect to the workpiece.

8. A method as claimed in claim 1, in which the heat is produced by ultrasonic vibration of the fastener.

9. A method of forming a hole in a workpiece which method is as claimed in claim 1, in combination with the subsequent step of installing the fastener in the hole thus formed.

10. A method of forming a hole in a workpiece which method is as claimed in a claim 9, including the step of engaging suitable means on the fastener with the thermoplastic workpiece by means of heat, whereby to resist rotation of the installed fastener in its hole.

* * * * *